United States Patent
Högblom et al.

(10) Patent No.: US 11,794,165 B2
(45) Date of Patent: Oct. 24, 2023

(54) POROUS SILICA PARTICLES

(71) Applicant: NOURYON CHEMICALS INTERNATIONAL B.V., Arnhem (NL)

(72) Inventors: Joakim Erik Patrik Högblom, Gothenburg (SE); Peter Lennart Gidlund, Gothenburg (SE); Börje Sigvard Persson, Angered (SE)

(73) Assignee: NOURYON CHEMICALS INTERNATIONAL B.V., Arnhem (NL)

( * ) Notice: Subject to any disclaimer, the term of this patent is extended or adjusted under 35 U.S.C. 154(b) by 342 days.

(21) Appl. No.: 16/886,176

(22) Filed: May 28, 2020

(65) Prior Publication Data

US 2020/0376464 A1 Dec. 3, 2020

(30) Foreign Application Priority Data

May 29, 2019 (EP) .................................... 19177275

(51) Int. Cl.
*B01D 15/20* (2006.01)
*B01D 53/02* (2006.01)
(Continued)

(52) U.S. Cl.
CPC .......... *B01J 20/283* (2013.01); *B01D 15/206* (2013.01); *B01D 53/025* (2013.01); *B01J 20/103* (2013.01);
(Continued)

(58) Field of Classification Search
CPC .. B01J 20/283; B01J 20/103; B01J 20/28052; B01J 20/28059; B01J 20/28061; B01J 20/28073; B01J 20/28076; B01J 20/28083; B01J 20/3085; B01J 2220/58; B01D 15/206; C01B 33/126; C01B 33/155; C01P 2006/12; C01P 2006/14; C01P 2006/16

See application file for complete search history.

(56) References Cited

U.S. PATENT DOCUMENTS

| 3,855,172 A | 12/1974 | Iler et al. |
| 4,874,518 A | 10/1989 | Kirkland et al. |

(Continued)

FOREIGN PATENT DOCUMENTS

| CN | 102432024 A | 5/2012 |
| CN | 106660812 A | 5/2017 |

(Continued)

OTHER PUBLICATIONS

Silicycle, "SiliaFlash® Irregular Silica Gels", Aug. 12, 2011.*
(Continued)

*Primary Examiner* — Benjamin L Lebron
(74) *Attorney, Agent, or Firm* — LORENZ & KOPF, LLP

(57) ABSTRACT

The present disclosure provides a porous silica having an average pore diameter of at least 210 Å and a pore volume of at least 0.80 cm$^3$g$^{-1}$. The present disclosure also provides a method of producing the porous silica including gelling a liquid phase-dispersed nanoparticulate silica in the presence of either (i) a Brønsted acid and an amine group having two or more primary or secondary amine groups or (ii) an amino acid.

17 Claims, 1 Drawing Sheet

(51) Int. Cl.
  *B01J 20/10* (2006.01)
  *B01J 20/28* (2006.01)
  *B01J 20/30* (2006.01)
  *C01B 33/12* (2006.01)
  *C01B 33/155* (2006.01)
  *B01J 20/283* (2006.01)

(52) U.S. Cl.
  CPC ... *B01J 20/28052* (2013.01); *B01J 20/28059* (2013.01); *B01J 20/28061* (2013.01); *B01J 20/28073* (2013.01); *B01J 20/28076* (2013.01); *B01J 20/28083* (2013.01); *B01J 20/3085* (2013.01); *C01B 33/126* (2013.01); *C01B 33/155* (2013.01); *B01J 2220/58* (2013.01); *C01P 2006/12* (2013.01); *C01P 2006/14* (2013.01); *C01P 2006/16* (2013.01)

(56) References Cited

U.S. PATENT DOCUMENTS

| | | | |
|---|---|---|---|
| 5,368,833 | A | 11/1994 | Johansson et al. |
| 6,103,209 | A | 8/2000 | Balducci et al. |
| 2001/0033931 | A1 | 10/2001 | Jiang et al. |
| 2015/0133294 | A1 | 5/2015 | Wyndham et al. |

FOREIGN PATENT DOCUMENTS

| | | |
|---|---|---|
| CN | 107207735 A | 9/2017 |
| CN | 107250069 A | 10/2017 |
| CN | 109399648 A | 3/2019 |
| EP | 0298062 A1 | 1/1989 |
| WO | 0198227 A1 | 12/2001 |
| WO | 2004035473 A1 | 4/2004 |
| WO | 2004035474 A1 | 4/2004 |
| WO | 2007070001 A2 | 6/2007 |
| WO | 2013092778 A2 | 6/2013 |
| WO | 2014206893 A1 | 12/2014 |

OTHER PUBLICATIONS

Chen, W., et al., "Synthesis and optimization of wide pore superficially porous particles by a one-step coating process for separation of proteins and monoclonl antibodies", Journal of Chromatography A, 1414, pp. 147-157. (Year: 2015).*
EPO, European Extended Search Report issued in European Application No. 19177275.5, dated Nov. 14, 2019.
Sears, G.W., Jr. "Determination of Specific Surface Area of Colloidal Silica by Titration with Sodium Hydroxide", Analytical Chemistry, 1956, p. 1981-1983, vol. 28, No. 12.
Iler, R.K. et al., "Degree of Hydration of Particles of Colloidal Silica in Aqueous Solution", J. Phys. Chem., 1956, p. 955-957, vol. 60, No. 7.
Watanbe,R., et al. "Extension of size of monodisperse silica nanospheres and their well-ordered assembly", Journal of Colloid and Interface Science, 2011, p. 1-7, vol. 360, No. 1.
Ullmann's Encyclopadie der Technischen Chemie in the section "Silicium-Verbindungen, Organische".
Arkles, B., "Silicon Compounds (Silanes)", Kirk-Othmer Encyclopedia of Chemical Technology, 2000.
Ullmann's Encyclopadie der Technischen Chemie, in the section on "Epoxidverbindungen".
Kirk-Othmer Encyclopedia of Chemical Technology, in the section on "Chlorohydrins".
Iler, R.K., "The Chemistry of Silica", 1979, p. 465, John Wiley & Sons.
Xu Haiyan et al.; "Nanotechnology in Biomedical Sciences."; Nanobiomedical Technology; Jun. 2009.
Wu Hongyu at al.; "Pore expansion and Amino Functionalization of Mesoporous Silica."; Chemical Research and Application; vol. No. 23; Issue: No. 11; 2011.

* cited by examiner

POROUS SILICA PARTICLES

CROSS REFERENCE TO RELATED APPLICATION

This application claims priority to European Patent Application No. 19177275.5, filed on May 29, 2019, the contents of which is incorporated herein by reference in their entirety.

TECHNICAL FIELD

The present relates to materials comprising porous silica particles and to a method of their production. The particles may be used in many applications either as is or in after surface modification, such as a stationary phase in chromatographic separation techniques.

BACKGROUND

Silica-based materials are commonly used in many applications, for example as stationary phases in chromatography, as catalysts or catalyst carriers, or as ion exchangers. Different applications have different requirements, for example particle purity, alkali metal content, pore characteristics and mechanical strength.

An advantage of silica is that its properties can be highly tailored, for example by varying its pore characteristics or by chemically modifying the surface. This can be highly useful in separation applications, for example, because such versatility enables it to be used for many different types of separation.

A common route to making porous silica materials suitable in separation technology, for example, is via sol-gel chemistry, where a silica precursor such as a nanoparticular or colloidal silica is gelled under controlled conditions. Such a technique is described in EP0298062. This typically produces a porous silica with an average pore diameter of up to 100 Å. Such silicas can be used to separating relatively small molecules, e.g. those having a molecular weight of 10000 or less. However, for larger molecule separations, such as proteins where molecular weight is substantially higher, larger pores are preferred, typically greater than 200 Å, and often of the order of 300 Å.

Although such larger pore materials can be made by Ostwald ripening of a silica precursor material (e.g. one having pore sizes of the order of 100 Å), this is a time consuming process, and also often consumes silica that itself has value, for example as a separation medium for smaller molecules, or as a catalyst carrier. In addition, it may also require effort and time to manufacture the silica starting material, in order to arrive at a final large pore product with the required characteristics.

Other techniques for making larger pore silica are described in U.S. Pat. Nos. 3,855,172, 4,874,518. However, a further problem with prior art materials is that the larger pore sizes are often associated with relatively broad pore size distributions, which can negatively impact mechanical strength.

SUMMARY

The present disclosure is aimed at providing an improved porous silica material that has a desirable combination of high median or average pore diameter, pore volumes in a range that ensures high performance efficiency and also high mechanical strength, and also a narrow pore size distribution that further helps to improve separation efficiency. The present disclosure is also aimed at the use of such materials as a stationary phase for separation. The present disclosure is further aimed at a method for making such materials.

The present disclosure provides a porous silica having an average pore diameter of at least 210 Å and a pore volume of at least 0.80 $cm^3g^{-1}$.

In one aspect, the present disclosure provides a porous silica with a median pore diameter of 210 Å to 500 Å, and with a pore volume of 0.80 $cm^3g^{-1}$ to 1.2 $cm^3g^{-1}$.

In another aspect, the present disclosure provides a method of producing a porous silica having an average pore diameter of at least 210 Å and a pore volume of at least 0.80 $cm^3g^{-1}$. The method comprises the step of gelling a liquid phase-dispersed nanoparticulate silica in the presence of either (i) a Brønsted acid and an amine compound having two or more primary or secondary amine groups or (ii) an amino acid.

In a further aspect, the present disclosure provides a method of using a porous silica having an average pore diameter of at least 210 Å and a pore volume of at least 0.80 $cm^3g^{-1}$ as a stationary phase for separation in chromatography.

In yet another aspect, the present disclosure relates to a separation column or vessel containing the porous silica.

BRIEF DESCRIPTION OF DRAWINGS

Advantages of the present disclosure will be readily appreciated as the same becomes better understood by reference to the following detailed description when considered in connection with the accompanying drawings.

DETAILED DESCRIPTION

The following detailed description is merely exemplary in nature and is not intended to limit the present disclosure or the application and uses of the preset disclosure. Furthermore, there is no intention to be bound by any theory presented in the preceding background of the present disclosure or the following detailed description.

The Porous Silica

The porous silica typically comprises no more than 10 wt % of other oxide components. In embodiments there is no more than 5 wt % other oxide components. Other oxide components can be other refractory oxides, for example oxides of aluminium, titanium, iron, chromium, zinc, zirconium, magnesium, calcium and cerium.

Alkali and alkaline earth content is also typically low, for example less than 1 wt % in total, and in further embodiments less than 0.1 wt %, for example less than 100 ppm.

In embodiments, the silica comprises no more than 0.1 wt %, for example no more than 100 ppm, of any other oxide or alkali/alkaline earth metal impurity.

An exception to the above levels of other oxides is in embodiments where the surface of the porous silica, or the surface of the nanoparticulate silica used to make the porous silica, has been deliberately modified or doped. This described in further detail below, but in embodiments there can be up to 10 wt % aluminium oxide, for example up to 5 wt % aluminium oxide.

The porous silica has a pore volume in the range of from 0.80 to 1.2 cm$^3$g$^{-1}$. In embodiments, the pore volume is in the range of from 0.81 to 1.2 cm$^3$g$^{-1}$, such as in the range of from 0.81 to 1.0 cm$^3$g$^{-1}$.

In embodiments, the average pore diameter of the porous silica is in the range of from 100 to 500 Å, for example in the range of from 200 to 450 Å, such as from 220 to 400, or from 220 to 350 Å.

The porous silica can have a specific (total) surface area in the range of from 50 to 500 m$^2$g$^{-1}$, for example 80 to 300 m$^2$g$^{-1}$. In embodiments, the specific surface area is in the range of from 90 to 200 m$^2$g$^{-1}$ or from 95 to 150 m$^2$g$^{-1}$, for example 95 to 135 m$^2$g$^{-1}$.

The porous silica can have a median pore diameter of from 210 to 500 Å, or from 250 to 450 Å. In embodiments, the silica has an average/median pore diameter in the range of from 300 to 400 Å.

Figure 1:
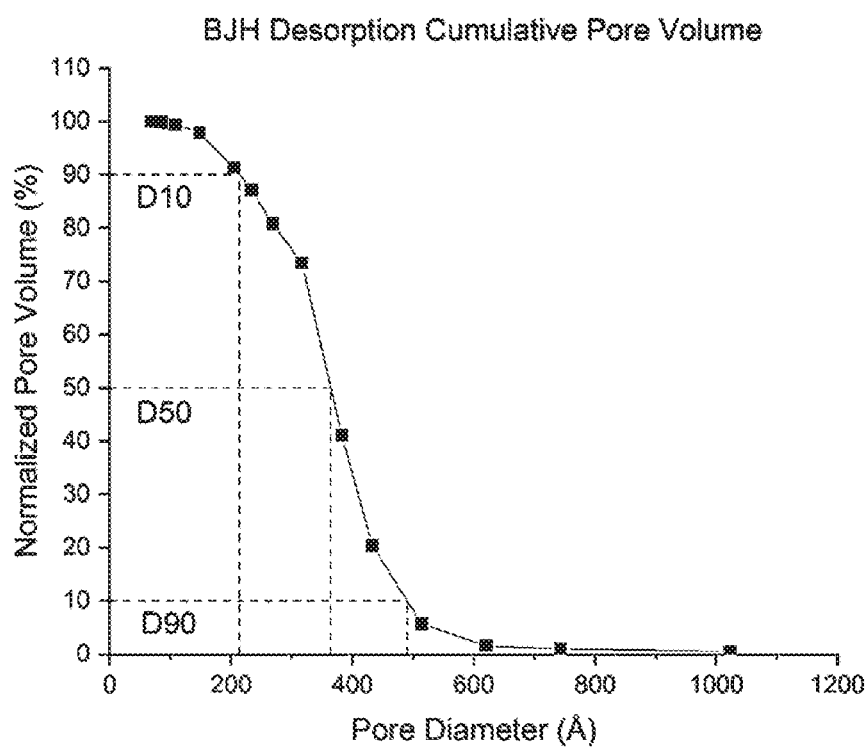
FIG. 1 is an exemplary plot of cumulative pore volume versus pore diameter of a porous material, highlighting how the D10, D50 and D90 values are interpreted.

The median pore diameter can optionally be referred to as a "D50" pore diameter. Pores with a diameter less than or equal to the median (D50) pore diameter contain 50% of the total pore volume of the material. Similarly, the "D10" or "D90" pore diameters are the diameters at which, respectively, 10% or 90% of the pore volume is contained. Thus, pores with diameters less than or equal to the D10 or D90 diameters contain, respectively, 10% or 90% of the total pore volume. The D10, D50 and D90 points are illustrated in FIG. 1.

Pore size distribution is a measure of the spread of pore sizes in the material. This can be conveniently expressed by the D90/D10 ratio. A smaller number implies a narrower spread of pore sizes.

In embodiments, the D90/D10 ratio is no more than 2.30. In further embodiments, the D90/D10 ratio is in the range of from 0.01 to 2.30. In further embodiments, the D90/D10 ratio is in the range of from 0.10 to 2.30 or from 1.00 to 2.30. In still further embodiments, the D90/D10 ratio is in the range of from 1.50 to 2.30. In other embodiments, the upper limit for the D90/D10 value is 2.25.

A suitable way of measuring pore size distribution and the D10, D50 and D90 pore diameters is by the Barrett-Joyner-Halenda (BJH) method, based on nitrogen adsorption/desorption, in particular from the desorption isotherm. A suitable way of measuring surface area, pore volume and average pore diameter (from the surface area and pore volume) is by the Brunauer-Emmett-Teller (BET) method, also based on nitrogen adsorption/desorption, the surface area typically being calculated from the linear part of the isotherm. Examples of such methods are given in ISO 9277:2010 (for BET) and ISO 15901-2:2006 (for gas adsorption/desorption).

The combination of pore volume, pore diameter and narrow pore size distribution means that the porous silica is highly effective as a stationary phase in separating large molecules (e.g. proteins). This is because the pore size is sufficiently large to allow good mass transport of such large molecules in and out of the pores, enabling their efficient absorption. Additionally, sufficiently high pore volumes in combination with high surface area and narrow pore size distribution provides highly defined pore structures, which also helps to ensure high separation efficiency. Further, by ensuring the pore volume is not too high, the mechanical strength and integrity of the porous silica can be maintained, thus avoiding damage to the material during separation column packing for example, again ensuring high separation efficiency.

The porous silica can be provided in a solid form, for example as a dry powder. In embodiments, it can be packed into separation columns, e.g. HPLC columns. In the dry powder form, the particle sizes (diameters) can be in the range of from 0.5 to 100 μm, for example in the range of from 0.7 to 50 μm, from 0.8 to 30 μm, or from 1 to 25 μm. In embodiments, they can be sieved to give narrower, more specific ranges of particle sizes.

Organosilane-Modified Silica

In embodiments, the porous silica can be modified with one or more organic groups, for example one or more $C_1$-$C_{30}$ aliphatic groups, or one or more $C_{5\text{-}10}$ aromatic or $C_{5\text{-}10}$ heteroaromatic groups (henceforth "A" groups). In embodiments, the aromatic or heteroaromatic groups are $C_{5\text{-}6}$ aromatic or heteroaromatic groups.

In A, aliphatic organic groups can optionally be substituted, for example with one or more groups selected from —OR, —C(O)O$^-$, —C(O)OR, —C(O)NR$_2$, —OC(O)R, —NRC(O)R, —NR—C(O)—NR$_2$, —NR$_2$, —[NR$_3$]$^+$, halide, epoxy, oxo, $C_{5\text{-}6}$ aromatic groups, $C_{5\text{-}6}$ heteroaromatic groups, $C_{5\text{-}6}$ heterocyclic aliphatic groups, and glycol ether groups of general formula —[O—(CR$^a{}_2$)$_n$]$_m$—OR$^b$.

In A, aromatic organic groups can optionally be substituted, for example with one or more groups selected from —OR, —C(O)O$^-$, —C(O)OR, —C(O)NR$_2$, —OC(O)R, —NRC(O)R, —NR—C(O)—NR$_2$, —NR$_2$, —[NR$_3$]$^+$, halide, epoxy, oxo, $C_{1\text{-}30}$ aliphatic groups, $C_{5\text{-}6}$ heterocyclic aliphatic groups and glycol ether groups of general formula —[O—(CR$^a{}_2$)$_n$]$_m$—OR$^b$.

Each R group is independently selected from hydrogen, $C_{1\text{-}30}$ aliphatic groups, $C_{5\text{-}6}$ aromatic groups, $C_{5\text{-}6}$ heteroaromatic groups and $C_{5\text{-}6}$ heterocyclic aliphatic groups; each R$^a$ is selected from hydrogen and $C_{1\text{-}4}$ alkyl groups; each R$^b$ group is hydrogen or a $C_{1\text{-}10}$ alkyl group; n is an integer from 2 to 3, and m is an integer from 2 to 20.

Any aliphatic or alkyl groups described herein (including those in functional groups such as alkoxy, amide, amine and ester groups) can be linear, branched or cyclic, and can be saturated or unsaturated. Typically, they are saturated. In embodiments, linear and branched groups are used, and in further embodiments linear groups.

R groups (other than hydrogen) can optionally be substituted by one or more substituents selected from hydroxyl, epoxy, $C_{1\text{-}4}$ alkoxy, carboxyl, halide (e.g. fluorine or chlorine) and —NH$_2$.

R$^a$ and R$^b$ groups (other than hydrogen) can optionally be substituted by one or more substituents selected from hydroxyl, $C_{1\text{-}4}$ alkoxy and halide (e.g. fluorine or chlorine). In embodiments, Ra groups are not halide substituted. In embodiments, R$^a$ and/or R$^b$ groups do not comprise any optional substituents.

Any heteroaromatic groups or heterocyclic aliphatic groups described herein can have one or more heteroatoms in the ring, selected from O, S and N, typically O or N. In embodiments, there are no more than 3 heteroatoms in the ring, for example no more than two, and in further embodiments there is only one heteroatom.

Unsaturated aliphatic groups can comprise one or more double bonds and/or one or more triple bonds. In embodiments, there are no triple bonds.

For compounds comprising charged groups, e.g. —C(O)O— or —[NR$_3$]$^+$ groups, they can also comprise a countering cation or anion respectively. Cations can be selected from proton (H$^+$), alkali metal, alkaline earth metal, ammonium or organoammonium ions of formula [NR$_4$]$^+$, where R is as defined above. Anions can be selected from halide (e.g. F—, Cl—, Br— and I—), hydroxide, nitrate, sulfate, chlorate, bromate, iodate, phosphate, tetrafluoroborate, hexafluorophosphate, sulfonates of formula R$^c$SO$_3$— and phosphonates of formula $R^cR_2PO_3$—, where each R is as defined above and each $R^c$ is selected from $C_{1-30}$ aliphatic groups, $C_{5-6}$ aromatic groups, and $C_{5-6}$ heteroaromatic groups, which can optionally be substituted as described above for R groups.

The modification of the silica can be achieved by reacting the silica with a suitable organic compound, for example an organosilane, which comprises the required group. This can be achieved using known procedures, for example those described in WO2007/070001. Organosilanes can be represented by the formula $Si[Z]_{4-y}[A]_y$. Each Z is typically selected from halides, hydroxyl and lower alkoxy groups, e.g. $C_{1-6}$ alkoxy groups or $C_{1-4}$ alkoxy groups. In embodiments, Z is selected from hydroxyl and lower alkoxy groups.

Each A is an optionally substituted $C_{1-30}$ aliphatic group, $C_{5-10}$ aromatic group or C5-10 heteroaromatic group as defined above. y is an integer in the range of from 1 to 3. Where y is more than 1, each A can be the same or different. Where y is less than 3, each Z can be the same or different, although in embodiments all Z groups are the same. Such compounds can be purchased commercially, or can be prepared by known techniques, for example those described in Ullmann's Encyclopädie der Technischen Chemie in the section "Silicium-Verbindungen, Organische" and in the Kirk-Othmer Encyclopedia of Chemical Technology, in the section "Silicon Compounds (Silanes)".

When using an organosilane to modify the silica, one or more Si—O—Si links form with the silica surface, by reaction with one or more surface silanol groups. For convenience, this link can be represented by $[SiO_2]$—Si—$[A]_y$.

In other embodiments, they can be modified using halohydrin compounds based on the formula HO—$CR(CR_2X)A$, where R and A are each as defined above, and X is a halogen, typically chlorine or bromine, preferably chlorine. These can be reacted with a silica surface using known techniques, for example those described in WO2014/206893. In embodiments, each R is H or methyl. The halohydrin compounds can be purchased commercially, or they can be produced using known procedures, for example as described in WO2013/092778, in Ullmann's Encyclopädie der Technischen Chemie, in the section on "Epoxidverbindungen", and also in the Kirk-Othmer Encyclopedia of Chemical Technology, in the section on "Chlorohydrins".

When reacted with a silica surface (for example by stirring the compound with silica at elevated temperature), the hydroxyl group reacts with a surface silanol group on the silica. For convenience, this can be represented by $[SiO_2]$—O—$CR(CR_2X)A$.

Where the silica is modified with two or more different organic groups, this can be achieved either by using different modifying reactants (e.g. two different $Si[Z]_{4-y}[A]_y$ reactants or two different HO—$C(CR_2X)A$ reactants), where each reactant has a different A group. In other embodiments, a $Si[Z]_{4-y}[A]_y$ reactant can be used where y is at least two, and which comprises two or more different A groups.

In embodiments, the silica can be modified with one or more A groups, which are each selected from $C_{1-30}$ alkyl groups, each optionally substituted as described above, although in embodiments the alkyl groups are unsubstituted. In embodiments, the silica can be modified with a $C_{10-20}$ alkyl group and a $C_{1-4}$ alkyl group, each optionally substituted as described above, although in embodiments both alkyl groups are unsubstituted.

The silica can be modified using known techniques, for example by stirring the silica in an aqueous solution at basic pH with one or more organosilane compounds as defined above. Such techniques are described for example in WO2007/070001 and WO2014/206893.

In other embodiments, the organic modification can be present in the starting materials for producing the silica according to the present disclosure. For example, an organosilane compound can be hydrolysed to form organosilane-modified silica particles, or in other embodiments a colloidal silica starting material can be modified with organosilane before it is gelled to form the silica according to the present disclosure, for example using the procedure described in WO2004/035473 and WO2004/035474.

Nanoparticulate Silica

In producing the large-pore silica of the present disclosure, a source of nanoparticulate silica is used. This can be in the form of a colloidal silica, as described further below. In other embodiments, the source of nanoparticulate silica can be a solid form of silica that is dispersed or suspended in a liquid phase. In embodiments, the silica nanoparticles (before dispersion or suspension) are in the form of fumed silica, precipitated silica or silica fume. In these types of silica, the primary particle size is preferably 200 nm or less, for example in the range of from 4 to 200 nm. The primary particles tend to be aggregated or agglomerated into larger particles, which can have diameters (or effective diameters) ranging from 300 nm to 100 μm.

Crystalline forms of silica, e.g. quartz, can also be used. However, because crystalline forms can be hazardous to health, they are preferably avoided.

Colloidal Silica

In preferred embodiments of the present disclosure, the source of nanoparticulate silica is a colloidal silica, in which primary colloidal silica particles with diameters in the range of from 2 to 200 nm are suspended in an aqueous medium. Typically, the levels of agglomeration of the primary particles are low, and the silica colloid is highly stable (i.e. does not spontaneously gel or aggregate) over periods of several months, typically 4 months or more, and in embodiments 6 months or more. Colloidal silica is often also referred to as a silica sol, and in this disclosure these two terms are used interchangeably.

The extent of gelling or aggregation of a colloidal silica can be described by the so-called "S value". In embodiments, for unmodified colloidal silica, the S value is in the range of from 10 to 95%, for example from 20 to 90% or from 30 to 90%. The S-value is measured and calculated as described by Iler & Dalton (Iler & Dalton; J. Phys. Chem., 60 (1956), 955-957). High S-values indicate highly dispersed silica particles with low levels of aggregation. Conversely, lower S-values indicate increased levels of microaggregation.

When colloidal silicas are used, they are generally aqueous sols containing no or low amounts of organic solvent. If organic solvents are present, the aqueous medium usually contains no more than 10 wt % organic solvent, for example no more than 5 wt % organic solvent. If organic solvent is present, it is preferably water-miscible, for example being selected from one or more of $C_{1-6}$ alkyl alcohols, $C_{1-6}$ aldehydes, $C_{3-6}$ ketones, $C_{1-6}$ carboxylic acids and their $C_{1-6}$ alkyl esters. Typically, if organic solvent is present, it is selected from $C_{1-6}$ alcohols.

Aqueous colloidal silicas can be basic, having a pH in the range of from 8.0 to 12.0, for example from 8.5 to 11.0. Other components of such sols include the presence of alkali metals, typically one or more of lithium, sodium and potassium, or ammonium or organoammonium ions $[NR^p_4]^+$, where each $R^p$ is independently selected from hydrogen, $C_{1-30}$ aliphatic, $C_{5-6}$ aromatic and $C_{5-6}$ heteroaromatic groups that are optionally substituted with one or more —OH or $C_{1-4}$ alkoxy groups.

Examples of suitable aqueous silicates or water glass that can be used to make aqueous silica sols include ammonium, lithium, sodium and potassium silicates.

Colloidal silica with neutral or acidic pH can also be used, for example at pH values of from 2 to 7. In such embodiments, the silica particles can be surface modified with cations, such as aluminium ions, as described for example in WO01/98227, U.S. Pat. No. 5,368,833 and by Iler in The Chemistry of Silica, John Wiley and Sons (1979).

In embodiments, the colloidal silica is made from a soluble silicate (e.g. water glass) or a polysilicic acid solution. This can be achieved by converting the soluble silicate to polysilicic acid (with a pH typically in the range of from 1-3) by ion exchange or treatment with acid, and raising the pH to 7 or more, typically 8 to 12, for example 8.5 to 11, using a basic salt such as alkali metal or $[NR^p_4]^+$ hydroxide or silicate.

The content of $[NR^p_4]^+$ or alkali metal in the starting silica sol is typically in the range of from 0.01 to 5.0 wt %, expressed as $[NR^p_4]$ or as alkali metal oxide. In embodiments, it is from 0.07 to 3.0 wt %.

The silica concentration in the colloidal silica is typically in the range of from 1 to 60 wt %, for example from 2 to 50 wt % or from 3 to 35 wt %, expressed as $SiO_2$.

The colloidal silica particles typically have a surface area in the range of from 50 to 500 $m^2g^{-1}$, for example in the range of from 75 to 300 $m^2g^{-1}$, such as from 100 to 150 $m^2g^{-1}$. The surface area of colloidal silica particles in a silica sol can be calculated from NaOH titration following the method of Sears (Sears; Anal. Chem., 1956, 28(12), 1981-1983).

The colloidal silica particles can have an average primary particle diameter ranging from 2 to 150 nm, for example from 2 to 100 nm or from 3 to 75 nm. In further embodiments, the particle diameter is in the range of from 4 to 50 nm.

The average particle diameters can be calculated from the titrated surface area using a method described in "The Chemistry of Silica", by Iler, K. Ralph, page 465, John Wiley & Sons (1979). Based on the assumption that the silica particles have a density of 2.2 g cm$^{-3}$, and that all particles are of the same size, have a smooth surface area and are spherical, then the average particle diameter (PD) can be calculated from Equation 1:

$$PD \text{ (nm)} = \frac{2720}{\text{Surface Area } (m^2g^{-1})} \quad \text{Equation 1}$$

Other ways of measuring average particle diameters include ES-DMA (electro-spray differential mobility analysis), CLS (centrifugal liquid analysis), SEM (scanning electron microscopy) and TEM (transmission electron microscopy).

The density of the silica sol is at least in part dependent on the silica content, but is typically in the range of from 1.01 to 1.30 g cm$^{-3}$, and in embodiments it is less than 1.2 g cm$^{-3}$.

The viscosity of the colloidal silica is typically less than 40 cP, for example less than 30 cP, and in particular less than 20 cP. In embodiments, it is less than 10 cP. These viscosities are measured at 20.0° C. Viscosities of silica sols, including those described herein, can be measured using a conventional rotational viscometer. A method that can be used is ASTM D4016-14.

In aqueous systems, the colloidal silica particles can be dispersed in the presence of stabilising cations, which can be selected from alkali metals (e.g. K$^+$, Na$^+$, Li$^+$), and ammonium or amino ions of formula $[NR_4]^+$, where R is as defined above. Typically, they are selected from alkali metals and ammonium (NH$_4^+$), and in preferred embodiments ammonium ions are used, since alkali metal ions, for example, are often undesirable for high purity chromatographic separation applications.

Examples of sols that can be used as starting aqueous silica sols include silica sols marketed under the name Levasil™ or Bindzil™ from Nouryon, in particular alkali metal-free grades.

Amine Compound Having Two or More Amine Groups

The nanoparticulate silica is gelled in the presence of an amine compound having two or more primary or secondary amine groups (i.e. having at least one N—H bond). The gelling takes place in the presence of a Brønsted acid.

In embodiments, the amine compound has a molecular formula according to any one of Formulae 1 to 3 below:

Formula 1

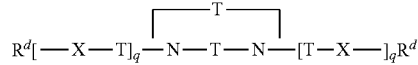

Formula 2

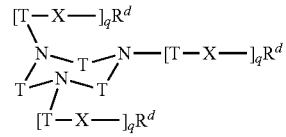

Formula 3

$R^d$ is on each occurrence independently selected from H and $C_{1-6}$ alkyl groups which are optionally substituted by one or two groups each selected from halogen (e.g. F, Cl, Br), —OR$^e$, —COOR$^e$ and —N[R$^e$]$_2$, where each R$^e$ independently is selected from H and $C_{1-6}$ alkyl;

T is on each occurrence independently selected from $C_{1-3}$ alkylene units (e.g. $C_{2-3}$ alkylene units), optionally substituted by one or more $C_{1-3}$ alkyl groups;

X is on each occurrence independently selected from —O—, —NR$^d$—, and

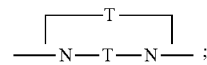

and q is on each occurrence independently selected from a whole number in the range of from 0 to 7.

Examples of the amine compounds in Formulae 1 and 2 comprising two or more amine groups include those where all occurrences of T are $C_2$ ethylene groups, such as ethylene diamine (EDA), diethylenetriamine (DETA), triethylenetetramine (TETA), tetraethylenepentaamine (TEPA), pentaethylenehexaamine (PEHA), piperazine (PIP), aminoethylpiperazine (AEP), hydroxyethylethylenediamine (HE-EDA), hydroxyethyldiethylenetriamine (HE-DETA), hydroxyethyltriethylenetetramine (HE-TETA), hydroxyethylpiperazine (HEP), methylethylenediamine (MeEDA—i.e.

Me-NH—CH$_2$—CH$_2$—NH$_2$) and tetramethylethylenediamine (TMEDA, i.e. Me$_2$N—CH$_2$CH$_2$—NMe$_2$).

Further examples include those where at least one and optionally all occurrences of T are C$_3$ propylene groups, such as propylene diamine (PDA), dipropylenetriamine (DPTA), tripropylenetetramine (TPTA), 1,5-diazocane (DAZ), aminopropyl-1,5-diazocane (AP-DAZ), hydroxypropylpropylenediamine (HP-PDA), hydroxypropyldipropylenetriamine (HPDPTA), hydroxypropylpropylenediamine (HP-PDA), hydroxypropyldipropylenetriamine (HP-DPTA), hydroxypropyltripropylenetetramine (HP-TPTA), and hydroxypropyl-1,5-diazocane (HP-DAZ).

Still further examples include those where at least one and optionally all occurrences of T are a C$_2$ alkylene group with a methyl substituent, such as isopropyldiamine (iPDA) and diisoprylaminetriamine (DiPTA).

Yet further examples include those where T groups are selected from C2 alkylene, methyl-substituted C$_2$ alkylene and C$_3$ alkylene, for example aminopropylethylenediamine (AP-EDA), diaminopropylethylenediamine (DAP-EDA), diaminoisopropylethylenediamine (DAiP-EDA), and aminopropylpiperazine (AP-PIP).

Therefore, in embodiments, T is selected from C$_2$ alkylene, monomethyl-substituted C$_2$ alkylene and C$_3$ alkylene units. In further embodiments, p is a whole number in the range of from 0 to 4, and R$^d$ is selected from H and C$_{1-3}$ alkyl, optionally substituted with OH and/or N[R$^e$]$_2$, where R$^e$ is H or C$_{1-3}$ alkyl.

For compounds where p is 2 or more, different isomers can exist. Taking TETA, TEPA and PEHA as examples, linear and different branched forms can exist:

L-TETA (linear isomer)

H$_2$N—C$_2$H$_4$—NH—C$_2$H$_4$—NH—C$_2$H$_4$—NH$_2$

I-TETA (branched isomer, also known as tris(aminoethyl)amine)

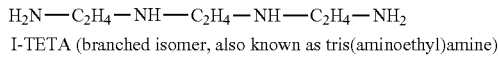

L-TEPA (linear isomer)

H$_2$N—C$_2$H$_4$—NH—C$_2$H$_4$—NH—C$_2$H$_4$—NH—C$_2$H$_4$—NH$_2$

I-TEPA (branched isomer)

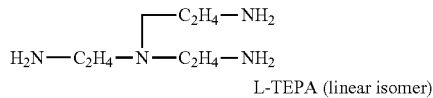

L-PEHA (linear isomer)

H$_2$N—C$_2$H$_4$-NH—C$_2$H$_4$-NH—C$_2$H$_4$-NH-C$_2$H$_4$-NH—C$_2$H$_4$—NH$_2$

I1-PEHA (branched isomer)

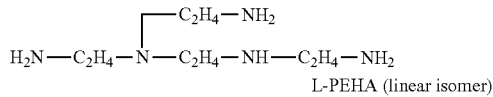

I2-PEHA (branched isomer)

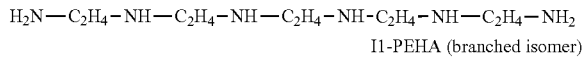

I3-PEHA (double-branched isomer)

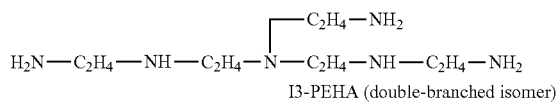

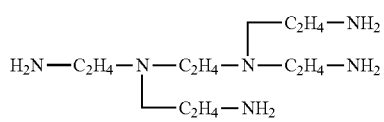

All such isomers are included in the above definitions.

Examples of compounds according to Formula 3 are also those where one or more A groups are C$_2$ alkylene groups, optionally methyl substituted, and q on each occasion can be 0, 1 or 2.

In embodiments, in any of Formulae 1, 2 or 3, Rd can be H or unsubstituted C1-6 alkyl, for example H or C1-2 alkyl. In embodiments, T is unsubstituted C$_{2-3}$ alkylene. X is selected from O and NR$^d$, where R$^d$ is H or unsubstituted C$_{1-6}$ akyl, for example H or C$_{1-2}$ alkyl.

In embodiments, the amine compound is of Formula 1 or 2. In further embodiments, the amine compound is of Formula 1, for example EDA.

One or more than one amine compound can be used.

Brønsted Acid

The Brønsted acid can be an organic or inorganic acid.

Suitable inorganic Brønsted acids include hydrohalic acids, (e.g. hydrochloric, hydrobromic or hydroiodic acid), halic acids (e.g. chloric acid, bromic acid or iodic acid, HIO3), perhalic acids (e.g. perchloric acid, perbromic acid, periodic acid), nitric acid, nitrous acid, sulfuric acid, sulfurous acid, phosphoric acid and phosphorous acid.

Suitable organic Brønsted acids include carboxylic acids, for example organic compounds of formula A, comprising one or more COOH group. Typically, the organic acid is a C$_{1-8}$ organic acid comprising one or more COOH group, e.g. 1, 2 or 3 COOH groups. In embodiments, the carboxylic acid can be formed in situ, for example by using a corresponding acyl halide (e.g. chloride, bromide or iodide) or anhydride, and providing conditions such that they hydrolyse to produce a carboxylic acid (e.g. through reaction with water). The organic acid can comprise more than one carboxylic acid group, for example two or three carboxylic acid groups. Examples include C$_{1-8}$ carboxylic acids, dicarboxylic acids and tricarboxylic acids, optionally with one or more hydroxyl substituents. Carbonic acid is also included. Specific examples of carboxylic acids include acetic acid, citric acid and oxalic acid.

The organic acid can be a sulfonic acid, or a phosphonic acid. Examples of sulfonic acids and phosphonic acids include those of formula R$^c$SO$_3$H and R$^c$R$_2$PO$_3$H, where R and R$^c$ are as defined above.

Salts of organic acids can also be used. Where salts are used, they are typically alkali or alkaline earth metal salts, or ammonium or organoammonium salts with cations of formula [NR$^p_4$]$^+$, as defined above.

In embodiments, the Brønsted acid is an organic acid, or a salt thereof. In further embodiments, the organic acid is a carboxylic acid, carbonic acid or oxalic acid. Organic acids have the advantage that no residue (e.g. in the form of involatile sulfate or phosphate moieties) will be left on the silica surface after high temperature calcination, which is a process step that can be employed when preparing porous silica. For similar reasons, where salts of organic acids are used, they are preferably organic salts such as [NR$^p_4$]$^+$ salts as defined above.

Amino Acids

In embodiments, an amino acid can be used in preparing the porous silica. In embodiments, the amino acid has the formula NR$^a_2$—CR$^a$R$^f$—COOH.

Each Ra is as defined above, and in embodiments, all R$^a$ are H.

R$^f$ is selected from C$_1$-C$_{30}$ aliphatic groups, optionally substituted with one or more groups selected from —OR$^a$, —SR$^a$, —C(O)O—, C(O)OR$^a$, —C(O)—NR$^a_2$, C$_{5-10}$ aromatic groups optionally substituted by one or more groups selected from R$^a$ and —OH, and C$_{5-10}$ heteroaromatic groups optionally substituted by one or more groups selected from Ra and —OH.

Also, in embodiments, the CR$^a$R$^f$ group can be a C$_{5-6}$ cyclic aliphatic group or C$_{5-6}$ heterocyclic aliphatic group, each of which can optionally be substituted with one or more groups selected from R$^a$ and —OH.

Other Components

Other components can be present in the mixture.

One or more emulsifiers can be used, to help stabilise the water-in-oil emulsion. They can be selected from organic emulsifiers, which are typically anionic, cationic, amphoteric, zwitterionic or nonionic surfactants, which are generally known and available commercially.

Examples include fatty acids, fatty amines, and fatty acid esters or partial fatty acid esters of polyvalent alcohols (e.g. mono-, di- or tri-glycerides), or corresponding anhydrides thereof. Fatty groups can be selected from C$_{6-22}$ aliphatic groups.

Further examples of emulsifiers include sorbitan esters (such as those sold under the trade name Span™), e.g. sorbitan monolaurate (e.g. Span™ 20) and sorbitan monooleate (e.g. Span™ 80). Further examples include polyethoxylated sorbitan esters (e.g. those sold under the trade name Tween™), such as PEG-20 sorbitan monolaurate (Tween™ 20), PEG-20 sorbitan monooleate (Tween™ 80) and Polyoxyethylenesorbitan trioleate (Tween™ 85). Other examples include C$_6$-C$_{22}$ alkyl sulfates, such as sodium dodecyl sulfate; sulfates with anions of formula C$_n$H$_{2n+1}$(OC$_m$H$_{2m}$)$_p$—OSO$_3$— where n is from 6 to 22, m is from 2 to 3, and p is from 2 to 4, such as sodium lauryl ether sulfate and sodium C$_{12-14}$ pareth-3 sulfate; C$_{6-22}$ alkyl glycosides, such as lauryl glucoside; glucamides of formula C$_n$H$_{2n+1}$C(O)N(X)CH$_2$(C$_4$H$_4$[OH]$_4$)CH$_2$OH, where n is from 6 to 22, and X is H or C$_{1-4}$ alkyl, for example capryl methyl glucamide, lauryl methyl glucamide and dodecyl glucamide; amino acids substituted with C$_{2-16}$ carboxylate groups and their salts, for example sodium or disodium cocoyl glutamate and sodium lauroyl sarcosinate; C$_{6-22}$ fatty acids and their salts, such as sodium oleate and potassium oleate; polyethylene glycol-substituted phenols with 5 to 25 glycol units, for example polyethylene glycol p-(1,1,3,3-tetramethylbutyl)-phenyl ether (which is available as Triton™ X-100); C$_{6-22}$ alkyl amine oxides, such as lauramine oxide and C$_{6-22}$ alkyl alcohols, such as cetyl alcohol and stearyl alcohol. Further examples include polymeric emulsifiers, such as (meth)acrylate and (meth)acrylic acid polymers (e.g. polymethylmethacrylic acid) and polymers based on organoammonium salts having at least one C$_{3-10}$ alkenyl group and at least one C$_{1-4}$ alkyl group, for example polydiallyldimethylammonium chloride (polyDADMAC).

One or more protective colloids can be used, often in combination with an emulsifier. Examples include polyvinyl alcohol or polyvinylpyrrolidone.

Polyvinyl alcohols can optionally be partially or fully saponified. In embodiments, the polyvinyl alcohol has a degree of hydrolysis in the range of from 70 to 100 mol %, for example in the range of from 80 to 100 mol %, or from 80 to 98 mol %. The Hoppler viscosity in 4% aqueous solution can be 1 to 70 mPas, or in other embodiments in the range of from 3 to 40 mPas (measured at 20° C. according to DIN 53015).

One or more thickening agents can be used, for example selected from water soluble polysaccharide-based or protein-based thickeners, such as cellulose derivatives and starch.

Cellulose derivatives include alkyl cellulose ethers, hydroxyalkyl cellulose ethers, carboxyalkyl cellulose ethers, hydroxyalkylpolyoxyalkyl cellulose ethers, and mixed ethers with at least two different substituents selected from alkyl, hydroxyalkyl, carboxyalkyl and/or hydroxyalkylpolyoxyalkyl. Alkyl groups can be C$_1$ to C$_{10}$-alkyl groups. Cellulose derivatives can also, or alternatively, be used as emulsifiers.

Cellulose ethers can have a degree of substitution (DS) in the range of from 1.2 to 2.9, for example from 1.6 to 2.2, but can also extend up to 3, which means a complete etherification of the cellulose. The substituents can be alkoxy groups, for example C1-4 alkoxy groups such as methoxy, ethoxy and/or propoxy groups. In embodiments, or at least one thickener is selected from methyl celluloses, ethyl celluloses, propyl celluloses, hydroxymethyl celluloses, hydroxyethyl cellulose, hydroxypropyl celluloses, methyl hydroxymethyl celluloses, methyl hydroxyethyl celluloses, methyl hydroxypropyl celluloses, ethyl hydroxymethyl celluloses, ethyl hydroxyethyl celluloses, ethyl hydroxypropyl celluloses, propyl hydroxymethyl celluloses, propyl hydroxyethyl celluloses and propyl hydroxypropyl celluloses.

Other polysaccharides that can be used include chemically modified or unmodified polysaccharides, for example guar, dextran, chitin, chitosan, mannans, galactans, xylans, starch, xanthan gum, Welan gum, Gellan gum, alginates, arabinoxylan, glucan and pectin.

Gelatins can also be used as thickeners.

One or more gelling accelerators can also be used. Examples include quaternary ammonium compounds, comprising C$_{1-4}$ alkyl groups that are optionally substituted with 1 or more groups selected from —OH and halide (e.g. fluoride or chloride), for example [3-chloro-2-propyl]trimethylammonium chloride. Another example of an accelerator is hexamethylenetetramine (or otherwise known as methenamine).

Water-in-Oil Emulsion or Dispersion

The process typically includes the formation of a water-in-oil dispersion or emulsion.

The aqueous phase typically comprises the nanoparticulate silica, for example by suspending a solid form of nanoparticulate silica in an aqueous medium, or using an aqueous colloidal silica as the source of the nanoparticulate silica.

The continuous "oil" phase typically comprises at least one organic compound that is insoluble in water or partially soluble in water, such that the solubility of the organic compound in water and/or the solubility of water in the organic solvent is no more than 10 wt %, for example no more than 5 wt %, for example in the range of from 1 wt % to 10 wt %, or from 1 wt % to 5 wt %.

In embodiments, the organic compound (or at least one of the organic compounds) forming the "oil" phase has a boiling point higher than that of water, i.e. greater than 100° C., for example 110° C. or more, such as 150° C. or more. In embodiments, the boiling point is no more than 400° C.

One or more organic compounds can be used in the continuous "oil" phase of the dispersion. They can be mixed with the aqueous phase to form an emulsion or dispersion. To improve emulsion stability, an emulsifier, thickener and/or protective colloid can be used The organic compounds are typically liquid phase at room temperature (25° C. under atmospheric pressure, i.e. 1.013 bara), and can be selected from those whose molecules comprise polar groups, for example one or more groups selected from esters, amides, aldehydes, ketones, alcohols (including glycols), ethers and sulfoxide. In embodiments, the organic molecule has from 3 to 12 carbon atoms. Esters, ketones and ethers may, in embodiments, be part of a cyclic structure.

In embodiments, additionally or alternatively, the organic compound can be non-polar, for example being selected from alkanes or aromatic compounds optionally substituted by one or more halides (e.g. F, Cl, Br, or I). Examples include $C_{1-20}$ paraffins, $C_{1-20}$ haloparaffins, $C_{6-20}$ aromatic compounds and $C_{6-20}$ haloaromatic compounds, where the aromatic or haloaromatic compounds can comprise one or more $C_{1-10}$ alkyl or $C_{1-10}$ haloalkyl groups.

Examples of organic compounds that can be used include ethyl acetate, ethyl formate, n-propyl formate, iso-propyl formate, n-propyl acetate, iso-propyl acetate, iso-butyl acetate, n-butyl acetate, n-pentyl formate, iso-pentyl formate, n-pentyl acetate, iso-pentyl acetate, ethyl propionate, iso-butyl iso-butyrate, n-butyl propionate, ethyl 3-ethoxypropionate, 2-ethylhexyl acetate, diethyl ketone, methyl isobutyl ketone, methyl isoamyl ketone, methyl n-amyl ketone, mesityl oxide, acetophenone, cyclohexanone, diethyl phthalate, benzyl acetate, methyl cyclohexanone, benzaldehyde, benzyl alcohol, diisopropyl ether, and anisole, phenetole. Other examples of solvents include toluene, xylene, methyl chloride, chloroform, carbon tetrachloride, methyl bromide, methyl iodide, trichloroethylene, and tetrachloroethylene. The organic solvent can be a mixture of two or more solvents.

Process Conditions

In the process according to the present disclosure, nanoparticulate silica is gelled to produce the porous silica.

The gelling is carried out in a biphasic system, which comprises an aqueous phase dispersed or emulsified in a continuous "oil" phase.

In the method, a basic nanoparticulate dispersion (e.g. a basic aqueous colloidal silica as described above) is mixed with an organic medium to form a water-in-oil dispersion or emulsion. Emulsions are preferred, to avoid the need for active procedures, such as vigorous stirring, to maintain dispersed aqueous droplets containing the nanoparticulate silica over extended periods of time. The organic medium comprises at least one or more water insoluble or partially water soluble organic solvents, as described above.

The nanoparticulate silica is present in the aqueous phase. The amine compound and acid, or the amino acid in the system can also be water-miscible, such that they completely or predominantly mix with the aqueous phase, i.e. they are water soluble, or at least partially water soluble, for example having a solubility in water under ambient conditions (i.e. atmospheric pressure, 25° C.) of at least 1 wt %, for example at least 10 wt %, or at least 20 wt % (i.e. at least 10 g dm$^{-3}$, for example at least 100 g dm$^{-3}$ or at least 200 g dm$^{-3}$). In embodiments, where the water-solubility is only partial, the amounts used are such that they are within the water-solubility limit.

The weight ratio of the amine compound or the amino acid to the silica (based on dry weight of $SiO_2$) is, in embodiments, in the range of from 0.005 to 1, for example in the range of from 0.01 to 0.6.

The content of silica (based on dry weight of $SiO_2$) in the total synthesis mixture can be in the range of from 0.01 to 50 wt %, for example in the range of from 0.1 to 30 wt %, from 0.5 to 15 wt % or from 1 to 10 wt %.

The weight ratio of the Brønsted acid, or the amino acid, to the silica (based on dry weight of $SiO_2$) can be in the range of from 0.005:1 to 1:1, for example in the range of from 0.01:1 to 0.6:1 or from 0.01:1 to 0.3:1.

In embodiments, the weight ratio of organic acid to the amine compound is in the range of from 0.02:1 to 1:1, for example 0.05:1 to 0.8:1.

In the above ratios, where there is more than one amino acid, amino compound or Brønsted acid, then the calculation is based on the total amount of amino acids, the total amino compounds and total Brønsted acids. An amino acid counts as both an amino compound and a Brønsted acid.

The gelling of the nanoparticulate silica into larger particles of porous silica is carried out by removing water from the system, typically by heating and/or using reduced pressure. Other conditions can also be controlled to assist the gelling.

For example, a gelling agent can be added, as described above.

In embodiments, the pH of the dispersion/emulsion, or at least the aqueous phase of the dispersion/emulsion, can be in the range of from 5 to 9. Acids or bases can be added in order to control the pH. For example, a Brønsted acid, amino compound or amino acid as defined above can be used. Other basic compounds that can be used include alkali metal hydroxides, alkaline earth metal hydroxides, ammonia or ammonium hydroxide, or hydroxides of $[NR^P_4]^+$ ions, typically ammonium ions, as defined above. In embodiments, a basic pH is used. In embodiments, alkali metal and alkaline earth metal hydroxides are avoided, so that no metallic residues are left on the porous silica after gelling, washing and calcining.

Typical gelling conditions include a temperature of 0 to 100° C. To increase the rate of gelling, elevated temperatures can be used, for example in the range of from 50 to 100° C., or 55 to 95° C. High temperatures tend to increase the rate of water evaporation.

Pressures in the range of from 0.01 to 1.10 bara (bar absolute) can be used. In embodiments, reduced pressures are used to assist water evaporation, for example pressures in the range of from 0.01 to 0.50 bara, for example in the range of from 0.03 to 0.25 bara.

To recover the large pore porous silica of the present disclosure, the remainder of the liquid (typically predominantly the organic phase) is removed, e.g. by centrifugation, decantation or filtration. The solid porous silica product can then be washed and/or dried if necessary, and optionally calcined. Calcination conditions include heating in air or under an oxygen containing gas comprising from 5 to 100 vol % oxygen, at temperatures of 400° C. to 900° C., for example in the range of from 550 to 700° C., and at a pressure in the range of from 0.5 to 5.0 bara, for example in the range of from 0.9 to 2.5 bara.

Previously used methods, which did not employ the combination of acid and amine compounds as defined above, or amino acids, have been unable to arrive at silicas having the required combination of high pore size and high pore volume characteristics. Typically, although large pore sizes can be achieved, the pore volume is much lower, which results in significantly reduced separation efficiency when used as a stationary phase.

Without being bound by theory, it is believed that the amine compound and the Brønsted acid act as a salt, which can shield the charges on the silica nanoparticles, reducing their electrostatic repulsion. This makes it easier for inter-particle Si—O—Si bonds, and helps to bind together silica nanoparticles that exist within the aqueous droplets at a faster rate than would otherwise be achieved merely by reducing the water content of the dispersion (e.g. through evaporation). This increased gelling rate leads to higher pore volumes and surface areas. A further advantage is that the pore size distribution is lower, a desirable property to help achieve even further improvements in chromatographic separation efficiency.

EXAMPLES

Example 1

A silica was prepared that had an average pore size of 286 Å, a surface area of 128 $m^2g^{-1}$, and a pore volume of 0.91 $cm^3g^{-1}$.

It was prepared using a 1500 $cm^3$ reactor equipped with an overhead stirrer. 500 g benzyl alcohol was added to the reactor, followed by a solution of 42.6 g water, 2.3 g hexamethylenetetramine and 0.4 g cellulose ether (Bermocoll E230X—ethyl hydroxyethyl cellulose). The mixture was stirred until homogeneous.

91.6 g of a 14 wt % aqueous colloidal silica (made by dilution of a 40 wt % Levasil™ CS40-614P silica sol, with a silica particle surface area of 130 $m^2g^{-1}$ according to the Sear's titration method) was added under constant stirring. Stirring was continued for 30 minutes to ensure a stable water-in-oil emulsion.

0.16 g glacial acetic acid, 0.22 g tetrabutylammonium hydroxide, 0.34 g ethylenediamine, 0.22 g butylamine and 0.27 g water were added. The resulting emulsion was heated by means of a heating jacket at 75° C., and distilled under vacuum (200 mbar absolute pressure). After 117 ml of the emulsion liquid had been distilled off, the reactor was cooled to room temperature. The remaining benzyl alcohol and silica-containing suspension was centrifuged, the benzyl alcohol liquid phase decanted off, and the recovered silica was re-suspended in ethanol and filtered. The filtered solid was washed with 790 g ethanol, and dried in an oven at 90° C. for 16 hours. It was then calcined in air at 650° C. for 5 hours.

The pore volume of the calcined material was 0.91 $cm^3 g^{-1}$, the specific surface area was 128 $m^2g^{-1}$, the average pore size was 286 Å, and the D90/D10 value was 2.05.

Example 2

50 g benzyl alcohol was added to a 250 $cm^3$ round-bottom flask. 4.5 g of an emulsifier solution was also added. The emulsifier solution was prepared from a mixture of 4.2 g water, 0.23 g hexamethylenetetramine, and 38 mg cellulose ether (Bermocoll E230X). The benzyl alcohol/emulsifier mixture was stirred until homogeneous, after which 9.2 g of the same 14% (w/w) silica sol as Example 1 was added to the mixture under constant stirring. The round-bottom flask was then fitted on a rotary evaporator, and rotated for 30 min at room temperature until a stable water-in-oil emulsion was produced. 23 mg of a 76% (w/w) aqueous acetic acid solution, and 91 mg of an 87% (w/w) aqueous ethylenediamine solution, were added to the emulsion. The emulsion was then heated to a temperature of 70° C. using the heating bath associated with the rotary evaporator, while under a reduced pressure of 160 mbar. After about 10 mL of the liquid phase had been distilled off, the flask was cooled to room temperature. The remaining contents were filtered to remove the porous silica, which was then washed by 40 g ethanol. The silica was re-suspended in 40 g ethanol, re-filtered and washed with a further 40 g ethanol. The silica was then dried in an oven at 90° C. for 20 h, and calcined in air at 650° C. in air for 6 h. The pore volume after calcination was 0.87 mL/g, the surface area was 132 m2 g−1, the average pore size was 262 Å, and the D90/D10 value was 2.24.

Example 3

To a 1500 $cm^3$ reactor equipped with an overhead stirrer, 900 g benzyl alcohol was added, followed by 82 g of an emulsifier solution. The emulsifier solution was made from 77.1 g water, 4.2 g hexamethylenetetramine, and 0.7 g cellulose ether (Bermocoll E230X). The mixture was stirred until homogeneous, after which 92.2 g of a 20% (w/w) silica sol, made by diluting the same 40 wt % silica sol as Example 1 was added under constant stirring. Stirring was continued for 30 min to produce a stable water-in-oil emulsion. After 30 min, 0.92 g of a 76% (w/w) aqueous acetic acid solution, and 1.83 g of an 87% (w/w) aqueous ethylenediamine solution, were added to the emulsion. The emulsion was then heated (water bath temperature of 75° C.) under a reduced pressure of 200 mbar. After about 120 mL of the emulsion liquid had distilled off, the reactor was cooled to room temperature. The remaining contents were poured into a plastic bottle, and the silica was allowed to sediment overnight. The benzyl alcohol was decanted and the silica was filtered and washed with 120 g ethanol. The silica was re-suspended in 120 g ethanol and re-filtered, followed by washing with a further 120 g ethanol. The silica was re-suspended, re-filtered and re-washed in the same way one further time. The resulting silica was dried in an oven at 90° C. for 20 h, and calcined in air at 650° C. for 6 h. The pore volume after calcination was 0.88 mL/g, the surface area was 128 $m^2 g^{-1}$, the average pore size was 273 Å, and the D90/D10 value was 1.81.

Example 4

To a 1500 $cm^3$ reactor equipped with an overhead stirrer, benzyl alcohol, 800 g, was added, together with 73 g of an emulsifier solution. The emulsifier solution was made from 68.6 g water, 3.7 g hexamethylenetetramine, and 0.6 g cellulose ether (Bermocoll E230X). The mixture was stirred until homogeneous, after which 92.2 g of the same 20% (w/w) silica sol as Example 3 was added under constant stirring. The mixture was stirred for a further 30 min to achieve a stable water-in-oil emulsion, after which 0.92 g of a 76% (w/w) aqueous acetic acid solution, and 1.83 g of an 87% (w/w) aqueous ethylenediamine solution were added. The emulsion was then heated (water bath temperature 75° C.) under a pressure of 200 mbar. When about 120 mL of the liquid had distilled off, the reactor was cooled to room temperature. The remaining contents were poured into a plastic bottle, and the silica was let to sediment overnight. The benzyl alcohol was decanted off, and the silica was filtered and washed with 120 g ethanol. The silica was re-suspended in 120 g ethanol, filtered again and washed with a further 120 g ethanol. The silica was re-suspended, re-filtered and re-washed in the same way one further time. The resulting silica was then dried in an oven at 90° C. for 20 h, and calcined in air at 650° C. for 6 h. The pore volume after calcination was 0.87 mL/g, the surface area was 129 m2/g, the average pore size was 269 Å, and the D90/D10 value was 1.97.

The properties of these four examples are shown in Table 1.

TABLE 1

Porous silica properties of Examples 1 to 4

| Example | SSA ($m^2g^{-1}$) | PV ($cm^3g^{-1}$) | Av. PD (Å) | D50 (Å) | D90/D10 |
|---|---|---|---|---|---|
| 1 | 128 | 0.91 | 286 | 379 | 2.05 |
| 2 | 132 | 0.87 | 262 | 340 | 2.24 |
| 3 | 128 | 0.88 | 273 | 333 | 1.81 |
| 4 | 129 | 0.87 | 269 | 333 | 1.97 |

SSA = Specific Surface Area
PV = Pore Volume
Av. PD = Average Pore Diameter
D50 and D90/10 are as defined above

Comparative Examples 5-10

A relatively low pore size silica was made by the process set out in EP0298062, and had an average pore diameter of 100 Å, a surface area of 319 $m^2g^{-1}$ and a pore volume of 0.84 $cm^3g^{-1}$.

The resulting material was then subjected to Ostwald ripening to grow the particles, and to increase the average pore diameter. The process involved adding 31 g of the silica to a 1 dm3 steel autoclave, together with 619 g water and 73 g of 25% aqueous ammonia solution. The autoclave was sealed and heated to 120° C. for 116 hours. After cooling to 30° C., 105 g of 63 wt % nitric acid was added. The silica was then filtered off, washed with 300 g water, followed by 158 g acetone. The silica was then dried in an oven at 90° C. for 16 hours. This method was reproduced six times. The resulting silicas had the properties set out in Table 2.

As can be clearly seen, the method of the present disclosure is simpler than conventional Ostwald ripening processes, and also achieves significantly narrower pore size distribution.

Figure 2:
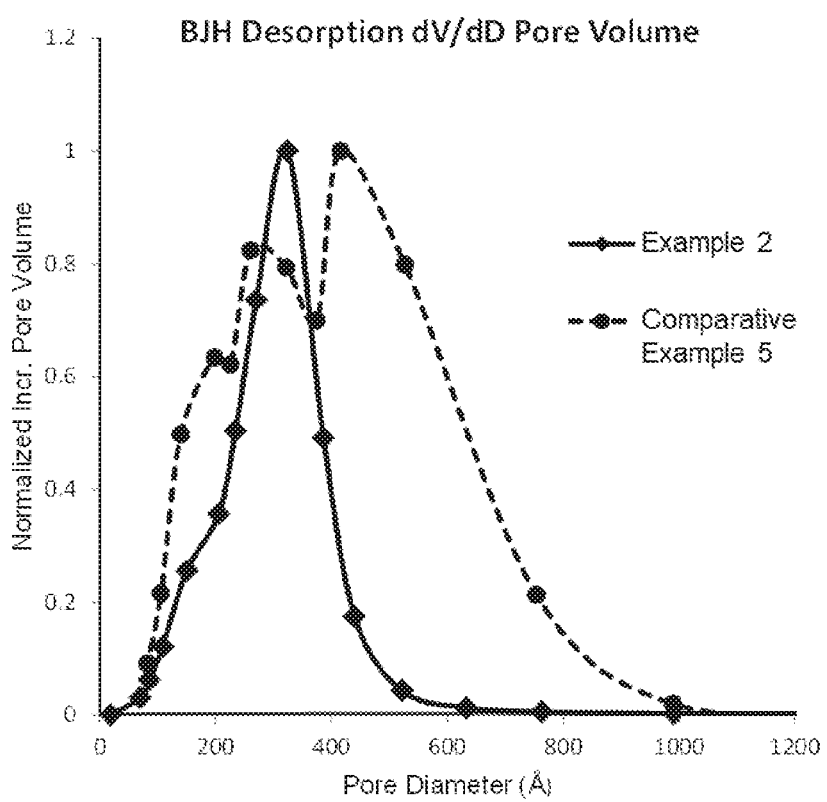
FIG. 2 is a BJH desorption dV/dD pore volume plot of a material representative of the present disclosure and a comparative material. Both curves are normalised to 1.

This narrower pore size distribution is apparent from FIG. 2, which compares the distributions for Example 2 and Comparative Example 5.

TABLE 2

Porous silica properties of Comparative Examples 5-10

| Example | SSA ($m^2g^{-1}$) | PV ($cm^3g^{-1}$) | Av. PD (Å) | D50 (Å) | D90/D10 |
|---|---|---|---|---|---|
| 5 | 101 | 0.83 | 329 | 387 | 4.56 |
| 6 | 110 | 0.89 | 322 | 380 | 4.14 |
| 7 | 118 | 0.94 | 318 | 369 | 3.75 |
| 8 | 113 | 0.94 | 332 | 387 | 3.95 |
| 9 | 113 | 0.94 | 335 | 411 | 3.45 |
| 10 | 113 | 0.98 | 349 | 426 | 3.92 |

SSA = Specific Surface Area
PV = Pore Volume
Av. PD = Average Pore Diameter
D50 and D90/10 are as defined above

Comparative Examples 11-15

Five commercially available butyl-modified silicas with ca 300 Å pore sizes and having particle sizes of 10 or 15 μm were calcined in air at 650° C. for 5 hours to remove the organic modification. This calcination process does not significantly affect the porosity characteristics of the silica (c.f. Examples 16-17 below). Properties of the resulting silicas are shown in Table 3.

The pore size distribution (D90/D10) of the commercially available samples is significantly greater than that of the silicas made according to the method described herein. For example 15, with the lowest pore size distribution of the comparative examples, it is notable that the pore volume is significantly higher than the examples representative of the present disclosure. This is indicative of reduced mechanical strength of the silica.

TABLE 3

Porous silica properties of Commercial Examples 11-15

| Example | SSA ($m^2g^{-1}$) | PV ($cm^3g^{-1}$) | Av. PD (Å) | D50 (Å) | D90/D10 |
|---|---|---|---|---|---|
| 11 | 99 | 0.74 | 300 | 403 | 3.05 |
| 12 | 113 | 0.79 | 280 | 313 | 2.77 |
| 13 | 99 | 0.96 | 389 | 430 | 2.81 |
| 14 | 120 | 1.06 | 354 | 365 | 3.08 |
| 15 | 169 | 1.41 | 334 | 344 | 2.36 |

SSA = Specific Surface Area
PV = Pore Volume
Av. PD = Average Pore Diameter
D50 and D90/10 are as defined above The following examples illustrate that calcining an organo-modified silica does not have a significant effect on the properties of the resulting silica.

Example 16

A silica sample was post-treated in a way equivalent to the post-treatment described in Example 1 (4) of EP0298062, and had a pore volume after post-treatment of 0.94 mL $g^{-1}$, a surface area of 122 $m^2g^{-1}$, and an average pore size of 307 Å. The pore size distribution D90/D10 was 2.07, with a D50 of 389 Å.

7 g of this "rehydroxylated" silica was dispersed in 139 g toluene in a 250 $cm^3$ 3-necked glass flask and heated to its boiling point until about 40 cm3 of liquid had been removed by evaporation. The temperature was then lowered to 90° C., and pyridine, 2.1 g, and butyldimethylchlorosilane, 2 g, were added. The silica dispersion was heated to reflux overnight. After 16 h, the temperature was lowered to room temperature and ethanol, 32 g, was added to deactivate the remaining silane. The silica slurry was poured into a glass filter funnel and filtered. The filter cake was washed by 356 g ethanol. The material was dried in an oven at 90° C. for 17 h. Elemental analysis gave a carbon content of 2.6 wt %, corresponding to a ligand coverage of 3.1 μmol $m^{-2}$.

Example 17

3 g of the organo-modified silica of Example 16 was calcined in air for 5 h at 650° C. to burn of the silane. The pore volume after post treatment was 0.89 mL $g^{-1}$, the surface area was 120 $m^2g^{-1}$, and the average pore size was 299 Å, and the pore size distribution D90/D10 was 2.07, with a D50 of 371 Å.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

What is claimed is:

1. A porous silica having an average pore diameter of from 250 to 450 Å, a pore volume of at least 0.80 cm$^3$g$^{-1}$ and up to 1.0 cm$^3$g$^{-1}$, and a pore size distribution calculated as a D90/D10 ratio of from 1.5 to 2.3.

2. The porous silica as set forth in claim 1, wherein one or more of the following conditions apply:
   (iv) the porous silica has a specific surface area of from 50 to 500 m$^2$g$^{-1}$;
   (v) the porous silica has a surface modified with one or more organic groups; and
   (vii) the porous silica is in solid form.

3. The porous silica as set forth in claim 1 having a pore size distribution calculated as a D90/D10 ratio from about 1.8 to about 2.25 and wherein the pore diameter is from 250 to 300 Å.

4. The porous silica as set forth in claim 3 having a pore volume of from 0.81 to 1.0 cm$^3$g$^{-1}$.

5. The porous silica as set forth in claim 1, wherein:
   the pore volume is at least 0.84 cm$^3$g$^{-1}$ and up to 1.0 cm$^3$g$^{-1}$.

6. A separation column or vessel comprising the porous silica of claim 1.

7. A process for producing a porous silica of claim 1, the process comprising the step of gelling a liquid phase-dispersed nanoparticulate silica in the presence of either (i) a Brønsted acid and an amine compound having two or more amine groups selected from primary amine groups and secondary amine groups or (ii) an amino acid.

8. The process as set forth in claim 7, wherein the nanoparticulate silica has primary particles having an average diameter of from 2 to 200 nm, and/or the liquid-phase dispersion of nanoparticulate silica is a water-in-oil emulsion or dispersion with the aqueous phase comprising the nanoparticulate silica and the Brønsted acid or the amino acid and the oil phase comprising at least one organic compound that is insoluble in water or partially soluble in water with the solubility of the at least one organic compound in water and/or the solubility of water in the at least one organic compound is no more than 10 wt %.

9. The process as set forth in claim 7, wherein the nanoparticulate silica is in the form of a colloidal silica.

10. The process as set forth in claim 9, wherein one or more of the following conditions apply:
    (i) the colloidal silica is aqueous, is made from a soluble silicate or polysilicic acid solution, and has a pH of from 8 to 12;
    (ii) the colloidal silica has an S value of from 10 to 95%; and
    (iii) particles of the colloidal silica have a surface area of from 50 to 1000 m$^2$g$^{-1}$.

11. The process as set forth in claim 7, wherein the amine group has a formula according to any one of Formulae 1 to 3:

Formula 1
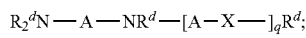
$R^d_2N-A-NR^d-[A-X-]_qR^d$;

Formula 2
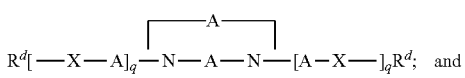
$R^d[-X-A]_q-N-A-N-[A-X-]_qR^d$; and

Formula 3
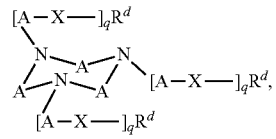

wherein:
R$^d$ is independently selected from H and C$_{1-6}$ alkyl groups which are optionally substituted by one or two groups each selected from halogen, —OR$^e$, —COOR$^e$, and —N[R$^e$]$_2$, where each R$^e$ is independently selected from H and C$_{1-6}$ alkyl;
A is independently selected from C$_{1-3}$ alkylene units optionally substituted by one or more C$_{1-3}$ alkyl groups;
X is independently selected from —O—, —NR$^d$—, and

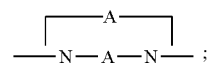

and
q is independently selected from a whole number from 0 to 7.

12. The process as set forth in claim 7, wherein the Brønsted acid is an organic acid selected from oxalic acid, carbonic acid, carboxylic acids, sulfonic acids and phosphonic acids.

13. The process as set forth in claim 12, wherein the carboxylic acids, the sulfonic acids, and the phosphonic acids are selected from those of formula R—C(O)OH, R$^c$—SO$_3$H, and R$^c$R$_2$PO$_3$H, wherein
each R is independently selected from H, optionally substituted C$_{1-30}$ aliphatic groups, optionally substituted C$_{5-10}$ aryl groups, and optionally substituted C$_{5-10}$ heteroaryl groups;
R$^c$ is selected from optionally substituted C$_{1-30}$ aliphatic groups, optionally substituted C$_{5-10}$ aryl groups, and optionally substituted C$_{5-10}$ heteroaryl groups.

14. The process as claimed in claim 13, in which:
the C$_{1-30}$ aliphatic groups are saturated or unsaturated and are linear, branched, or cyclic;
each of the C$_{1-30}$ aliphatic organic groups is optionally substituted with one or more groups selected from —OR, —C(O)OH, —C(O)OR, —C(O)NR$_2$, —OC(O)R, —NRC(O)R, —NR—C(O)—NR$_2$, —NR$_2$, —[NR$_3$]$^+$, halide, epoxy, oxo, C$_{5-6}$ aromatic groups, C$_{5-6}$ heteroaromatic groups, and glycol ether groups of general formula —[O—(CR$^a_2$)$_n$]$_m$—OR$^b$;
each of the C$_{5-10}$ aryl groups and C$_{5-10}$ heteroaryl groups is optionally substituted with one or more groups selected from —OR, —C(O)OH, —C(O)OR, —C(O)NR2, —OC(O)R, —NRC(O)R, —NR—C(O)—NR$_2$, —NR$_2$, —[NR$_3$]$^+$, halide, epoxy, oxo, C$_{1-30}$ aliphatic groups, and glycol ether groups of general formula —[O—(CR$^a_2$)$_n$]$_m$—OR$^b$
wherein:
each R is selected from hydrogen, C$_{1-30}$ aliphatic groups, C$_{5-6}$ aromatic groups, and C$_{5-6}$ heteroaromatic groups;
each R$^a$ is selected from hydrogen and C$_{1-4}$ alkyl groups;
each R$^b$ is hydrogen or a C$_{1-10}$ alkyl group;
n is an integer from 2 to 3, and
m is an integer from 2 to 20,
and wherein in the optional substituents, any aromatic, heteroaromatic, aliphatic, alkyl or alkoxy groups are optionally substituted with one or more substituents selected from hydroxyl, $C_{1-4}$ alkoxy, carboxyl, halide, and $-NH_2$, and any heteroaromatic groups or cyclic aliphatic groups has one or more heteroatoms in the ring selected from O, S and N.

15. The process as set forth in claim 7, wherein one or more of the following conditions apply:
   (i) a weight ratio of the amine group and/or the amino acid to silica (based on dry weight of $SiO_2$) is from 0.005 to 1;
   (ii) a silica content (based on dry weight of $SiO_2$) of the total process mixture is from 0.001 to 50 wt %;
   (iii) a weight ratio of the Brønsted acid and/or amino acid to silica (based on dry weight of $SiO_2$) is from 0.005:1 to 1:1;
   (iv) a weight ratio of Brønsted acid to the amine compound is from 0.02:1 to 1:1;
   (v) the amine group is selected from:

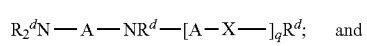

Formula 1

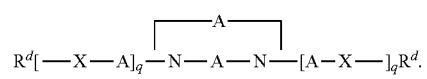

Formula 2

16. The process as set forth in claim 7, further comprising the steps of:
   separating the porous silica from the liquid phase; and
   optionally modifying the porous silica with one or more organic groups.

17. The process as set forth in claim 7, wherein the Brønsted acid comprises acetic acid and the amine compound comprises ethylenediamine.

* * * * *